US012423895B2

(12) United States Patent
Wang et al.

(10) Patent No.: US 12,423,895 B2
(45) Date of Patent: Sep. 23, 2025

(54) ADAPTIVE EDITING EXPERIENCE FOR MIXED MEDIA CONTENT

(71) Applicant: ADOBE INC., San Jose, CA (US)

(72) Inventors: Ian Yin Qi Wang, Sausalito, CA (US); Benjamin Gabriel Matthews, San Mateo, CA (US); Zachary Sanislo Silverstein, Seattle, WA (US); Stephanie Marie Calabro, Seattle, WA (US)

(73) Assignee: ADOBE INC., San Jose, CA (US)

( * ) Notice: Subject to any disclaimer, the term of this patent is extended or adjusted under 35 U.S.C. 154(b) by 137 days.

(21) Appl. No.: 18/348,522

(22) Filed: Jul. 7, 2023

(65) Prior Publication Data

US 2024/0127512 A1     Apr. 18, 2024

Related U.S. Application Data

(60) Provisional application No. 63/379,811, filed on Oct. 17, 2022.

(51) Int. Cl.
*G06T 11/60*     (2006.01)
*G06F 40/166*     (2020.01)
*G11B 27/031*     (2006.01)

(52) U.S. Cl.
CPC ............ *G06T 11/60* (2013.01); *G06F 40/166* (2020.01); *G11B 27/031* (2013.01); *G06T 2200/24* (2013.01)

(58) Field of Classification Search
CPC ... G06T 11/60; G06T 2200/24; G06F 40/166; G11B 27/031
See application file for complete search history.

(56) References Cited

U.S. PATENT DOCUMENTS

| | | | | |
|---|---|---|---|---|
| 2010/0281377 | A1* | 11/2010 | Meaney ................ | G06F 3/0482 715/725 |
| 2013/0073961 | A1* | 3/2013 | Agnoli ................. | G11B 27/034 715/716 |
| 2019/0250806 | A1* | 8/2019 | Matsuda ............. | G06F 3/04842 |

* cited by examiner

*Primary Examiner* — Cao H Nguyen
(74) *Attorney, Agent, or Firm* — F. CHAU & ASSOCIATES, LLC

(57) ABSTRACT

A method, apparatus, and non-transitory computer readable medium for multimedia processing are described. Embodiments of the present disclosure obtain a project file comprising page data for one or more pages. Each of the one or more pages comprises a spatial arrangement of one or more media elements. A media editing interface presents a page of the one or more pages based on the spatial arrangement. The media editing interface presents a scene line adjacent to the page. The scene line comprises a temporal arrangement of one or more scenes within the page, and the one or more media elements are temporally arranged within the one or more scenes.

20 Claims, 13 Drawing Sheets

ADAPTIVE EDITING EXPERIENCE FOR MIXED MEDIA CONTENT

CROSS-REFERENCE TO RELATED APPLICATION

This application claims priority under 35 U.S.C. § 119 to U.S. Provisional Application No. 63/379,811, filed on Oct. 17, 2022, in the United States Patent and Trademark Office, the disclosure of which is incorporated by reference herein in its entirety.

BACKGROUND

The following relates generally to multimedia processing, and more specifically to multimedia content editing. Multimedia processing refers to the use of a computer to process different types of media content to generate a multimedia digital product. In some cases, media content involves text, image, audio, video, animation effects, etc. Creation of multimedia content includes use of multimedia-centric tools which are built around one of two paradigms, i.e., page based paradigm (e.g., presentations, reports, slides deck, etc.) or temporal based paradigm (e.g., videos).

SUMMARY

Embodiments of the present disclosure include a multimedia creation tool configured to combine the temporal-based and page-based editing paradigms. In some cases, a temporal editing paradigm refers to video timeline or scene-line controls. A media editing interface of the multimedia creation tool presents a scene line adjacent to a page. The scene line includes a temporal arrangement of one or more scenes within the page. One or more media elements are temporally arranged within the one or more scenes. Thus, users can easily design digital outputs using the media editing interface which saves time and is integrated. For example, users can create expressive content for a social media platform (e.g., Instagram® stories).

A method, apparatus, and non-transitory computer readable medium for multimedia processing are described. One or more embodiments of the method, apparatus, and non-transitory computer readable medium include obtaining a project file comprising page data for one or more pages, wherein each of the one or more pages comprises a spatial arrangement of one or more media elements; presenting, via a media editing interface, a page of the one or more pages based on the spatial arrangement; and presenting, via the media editing interface, a scene line adjacent to the page, wherein the scene line comprises a temporal arrangement of one or more scenes within the page, and wherein the one or more media elements are temporally arranged within the one or more scenes.

A method, apparatus, and non-transitory computer readable medium for multimedia processing are described. One or more embodiments of the method, apparatus, and non-transitory computer readable medium include presenting content to a user via a media editing interface including a page control element for modifying a spatial arrangement of a page of the content and a temporal control element for modifying a temporal arrangement of scenes located within the page; receiving a page control input for editing the content via the page control element; receiving a temporal control input for editing the content via the temporal control element; and generating modified content based on the page control input and the temporal control input.

An apparatus and method for multimedia processing are described. One or more embodiments of the apparatus and method include a processor and a memory comprising instructions executable by the processor to: obtain a project file, via a media editing interface, comprising page data for one or more pages, wherein each of the one or more pages comprises a spatial arrangement of one or more media elements; present, via the media editing interface, a page of the one or more pages based on the spatial arrangement; and present, via the media editing interface, a scene line adjacent to the page, wherein the scene line comprises a temporal arrangement of one or more scenes within the page, and wherein the one or more media elements are temporally arranged within the one or more scenes.

DETAILED DESCRIPTION

Figure 1:
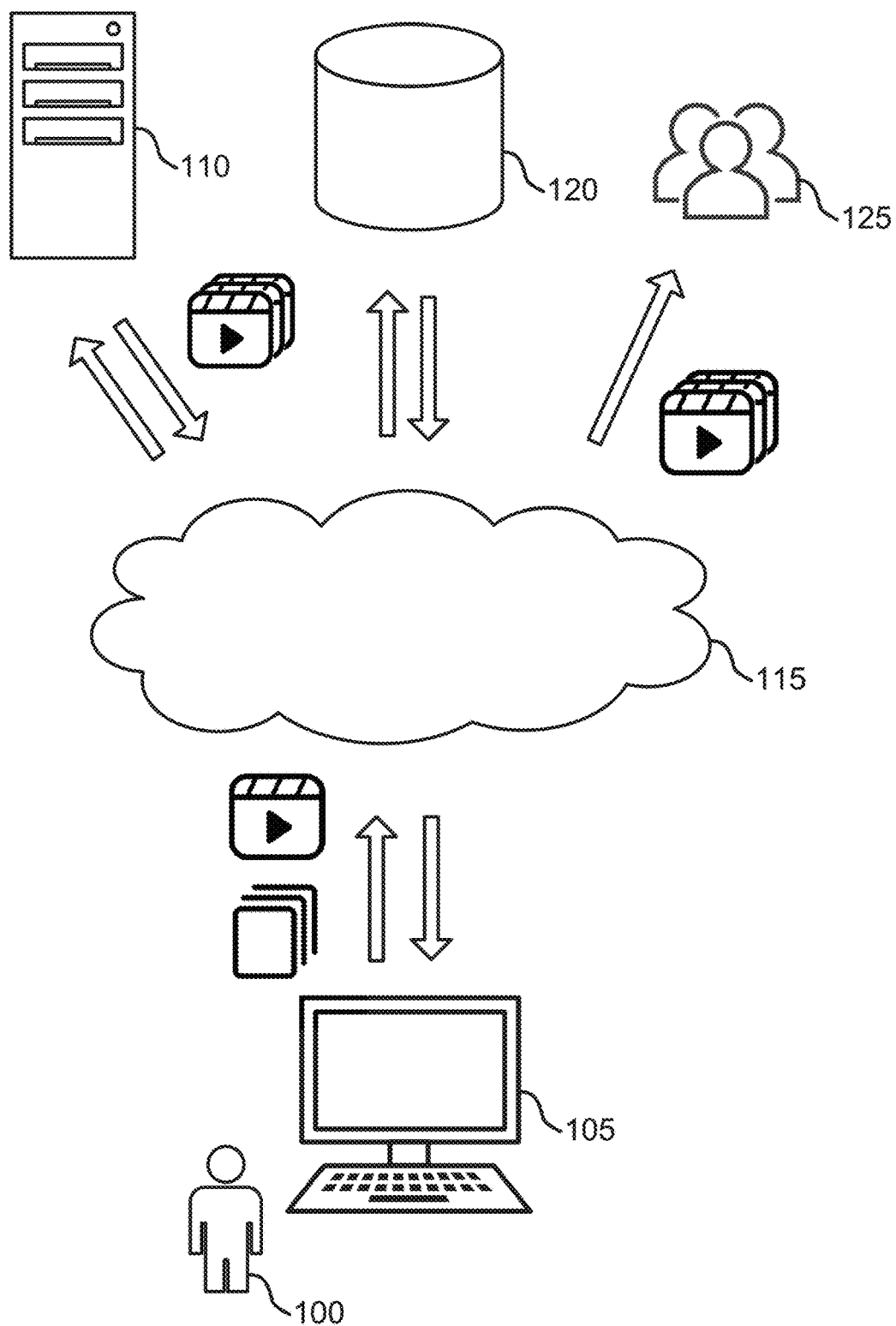
FIG. 1 shows an example of a multimedia processing system according to aspects of the present disclosure.

Embodiments of the present disclosure include a multimedia creation tool configured to combine the temporal-based and page-based editing paradigms. In some cases, a temporal editing paradigm refers to video timeline or scene-line controls. A media editing interface of the multimedia creation tool presents a scene line adjacent to a page. The scene line includes a temporal arrangement of one or more scenes within the page. One or more media elements are temporally arranged within the one or more scenes. Thus, users can easily design digital outputs using the media editing interface which is efficient, less time-consuming, and integrated. For example, users can create expressive content for a social media platform (e.g., Instagram® stories).

Creation of multimedia content (e.g., a composite multimedia campaign or project) includes use of multimedia-centric tools which are built around one of two paradigms, i.e., page based paradigm (e.g., presentations, reports, etc.) or temporal based paradigm (e.g., videos). For example, a user who wants to edit three videos have to open each of the three videos on a video editing application and perform the editing separately for the videos. Additionally, page based creation tools such as Microsoft® PowerPoint are directed towards editing static media elements and fail to work with videos. Thus, category-specific tools and outputs are considered obsolete for creating multimedia content.

In some cases, a social media story can be considered as content broken down into multiple sequential pages. Users can choose between static content (e.g., an image) or dynamic content (e.g., a video) on each of the pages. When the user chooses dynamic content in a page, the page may include content which comprises multiple scenes. For example, a scene includes image, text, audio data, video sequences, etc. Conventional media creation tools do not provide for an integrated editing experience for creating multiple scenes temporally arranged in a single page. In some cases, when publishing content to a social media platform, users take video outputs and static outputs from different media creation tools and combine the outputs on a third tool (e.g., a social media platform) for publication. Thus, users have to frequently switch between media creation tools which is inconvenient and time consuming.

Conventional methods create multimedia outputs that are centered around either page-based or temporal-based paradigms. For example, presentation tools (such as Microsoft® PowerPoint) are page-based and provide minimal support for multimedia creations by animating an input video. For example, if a user wishes to create a multimedia output to combine two videos, the user has to upload the two videos on two separate pages. However, such presentation tools are not able to sequence the assets over time. Additionally, such presentation tools are unable to combine two or more videos into a continuous video. Thus, creating a video using such presentation tools may be time consuming.

In some examples, temporal-based editing tools (video editing platforms such as InShot® or iMovie®) provide for multimedia creations, precise sequencing, timing, and transitions. However, temporal-based editing tools do not provide page controls (e.g., spatial arrangements of media elements on one or more pages). As a result, creating a presentation in a temporal-based tool is not possible.

Embodiments of the present disclosure include a multimedia creation tool configured to combine temporal-based editing paradigm and page-based editing paradigm. In some cases, the two paradigms enable complete page control and nested temporal control within a page of a project. Additionally, the multimedia creation tool simultaneously provides capabilities to preview, align, time, and export true digital native outputs as desired.

In some embodiments, a multimedia processing apparatus obtains a project file comprising page data for one or more pages. Each of the one or more pages includes a spatial arrangement of one or more media elements. The multimedia processing apparatus presents, via a media editing interface, a page of the one or more pages based on the spatial arrangement. Additionally, the multimedia processing apparatus presents, via the media editing interface, a scene line adjacent to the page. The scene line includes a temporal arrangement of one or more scenes within the page, and the one or more media elements are temporally arranged within the one or more scenes.

Embodiments of the disclosure include a user interface (e.g., media editing interface) that includes a display region for displaying a set of pages of a project file. One or more media elements can be spatially arranged on the page. When a page is selected, the media editing interface displays a scene line for editing video content within the page. The scene line includes a temporal arrangement of one or more scenes within the page. Multiple pages can be displayed in a carousel, in a temporal arrangement, or in a spatial arrangement. The pages of a project may be linked structure-based with a sequential order or a spatial arrangement. Each page may have metadata including a page size, margins, layout, and a list of elements included in the page.

By combining page-based function and temporal editing function into one integrated user interface, embodiments of the present disclosure enable users to generate multimedia content with increased efficiency and seamless content editing. Users avoid switching between different editing tools to combine static media content and dynamic media content (e.g., multiple videos). The multimedia processing apparatus also enables integration of various types of media elements and users can easily modify temporal aspects of scenes along a scene line within a page, such as adding a new scene, removing a scene, arranging the ordering of multiple scenes. In the meantime, the convenience of page-based design is preserved such that users can navigate from one page to another page for content editing (e.g., work on additional media objects and scenes within a different page).

Multimedia Processing Architecture

Figure 2:
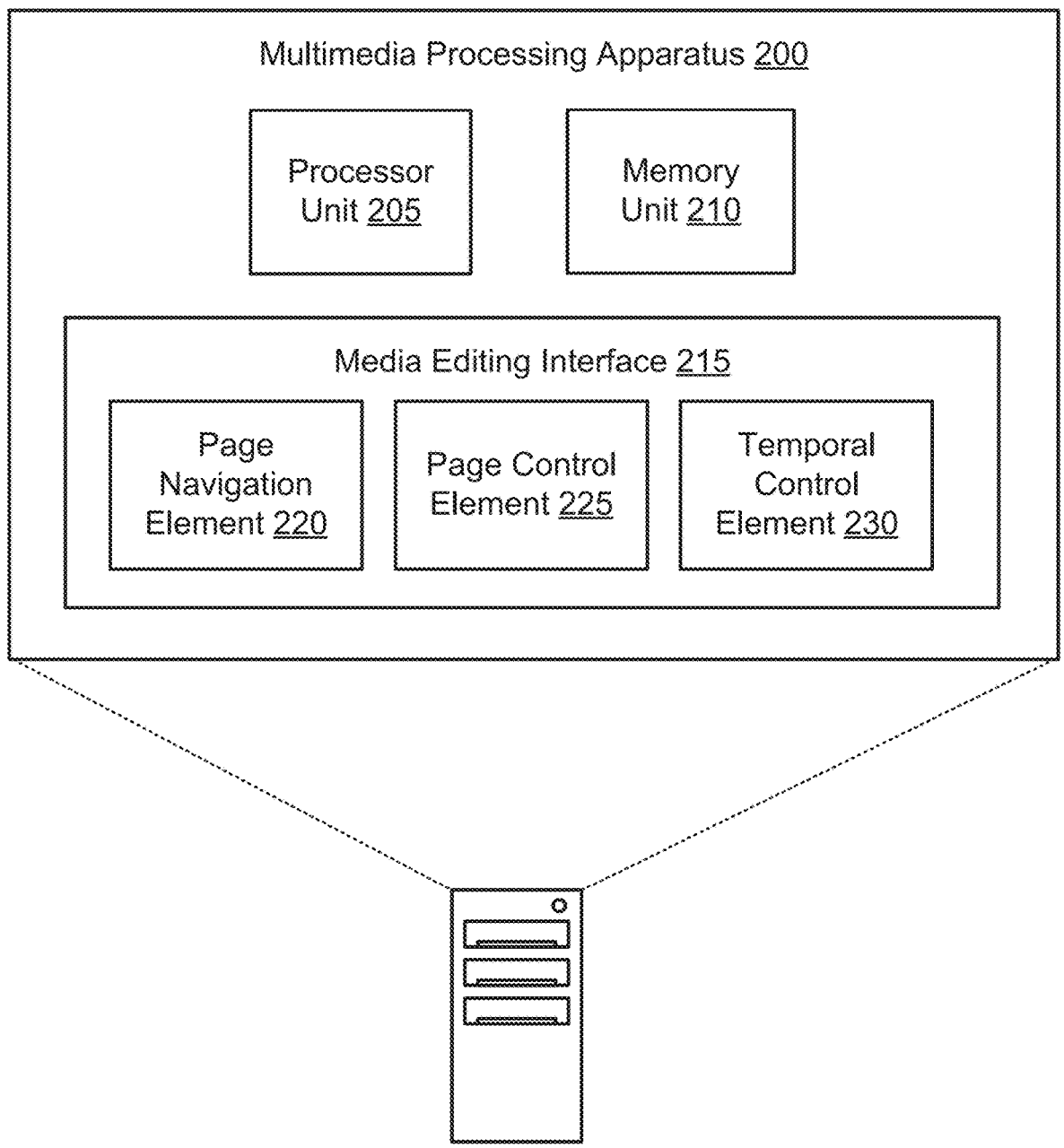
FIG. 2 shows an example of a multimedia processing apparatus according to aspects of the present disclosure.

In FIGS. 1-2, an apparatus and method for multimedia processing are described. One or more aspects of the apparatus and method include a processor; and a memory comprising instructions executable by the processor to: obtain a project file, via a media editing interface, comprising page data for one or more pages, wherein each of the one or more pages comprises a spatial arrangement of one or more media elements; present, via the media editing interface, a page of the one or more pages based on the spatial arrangement; and present, via the media editing interface, a scene line adjacent to the page, wherein the scene line comprises a temporal arrangement of one or more scenes within the page, and wherein the one or more media elements are temporally arranged within the one or more scenes.

In some examples, the media editing interface comprises a page navigation element, a page control element, and a temporal control element. In some examples, the page control element comprises an add page element, a remove page element, a duplicate page element, a page size element, or a page orientation element. In some examples, the temporal control element comprises a video sequencing element, a video transition element, or a video pacing element.

FIG. 1 shows an example of a multimedia processing system according to aspects of the present disclosure. The example shown includes user 100, user device 105, multimedia processing apparatus 110, cloud 115, database 120, and social media platform 125.

As an example shown in FIG. 1, user 100 provides one or more media contents to multimedia processing apparatus 110 via user device 105 and cloud 115. For example, the media contents may include an image, a video, a soundtrack, text, etc. In some cases, user 100 retrieves media contents from database 120. In some cases, user 100 uploads original media contents to multimedia processing apparatus 110. Multimedia processing apparatus 110 (or user device 105) may provide a user interface (e.g., media editing interface) for editing the media contents to create multimedia content. The media contents may be spatially arranged on one or more pages in the user interface. Additionally, the media contents may be temporally arranged on one or more pages.

According to some aspects, multimedia processing apparatus 110 generates the multimedia content based on the media contents. Multimedia processing apparatus 110 displays the multimedia content to user 100 via user device 105. Accordingly, multimedia processing apparatus 110 publishes the modified project file to a social media platform

125. Multimedia processing apparatus 110 is an example of, or includes aspects of, the corresponding element described with reference to FIG. 2.

User device 105 may be a personal computer, laptop computer, mainframe computer, palmtop computer, personal assistant, mobile device, or any other suitable processing apparatus. In some examples, user device 105 includes software that incorporates an image processing application. In some examples, the image processing application on user device 105 may include functions of multimedia processing apparatus 110.

A user interface (e.g., media editing interface) may enable user 100 to interact with user device 105. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a user interface may be represented in code which is sent to the user device and rendered locally by a browser.

Multimedia processing apparatus 110 includes media editing interface which may be implemented on user device 105. In some embodiments, the media editing interface includes a page navigation element, a page control element, and a temporal control element. Additionally, multimedia processing apparatus 110 communicates with database 120 via cloud 115.

Figure 12:
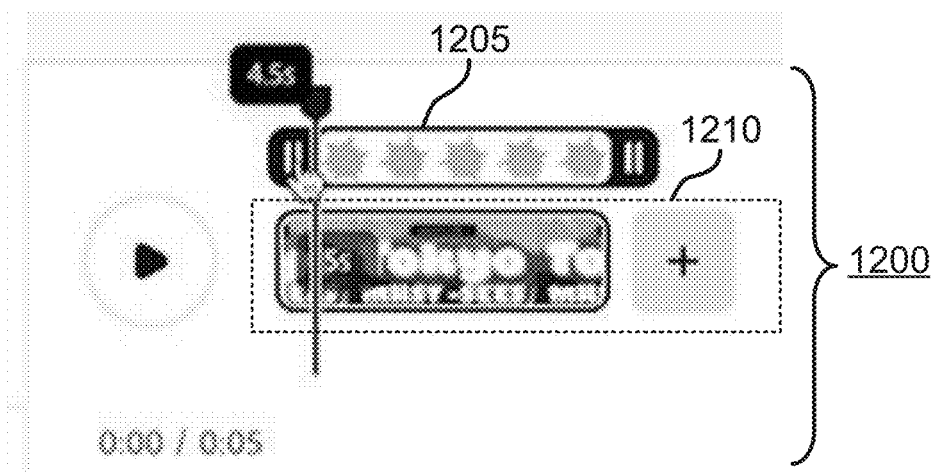
FIG. 12 shows an example of modifying temporal aspect of a media file according to aspects of the present disclosure.
Figure 12:
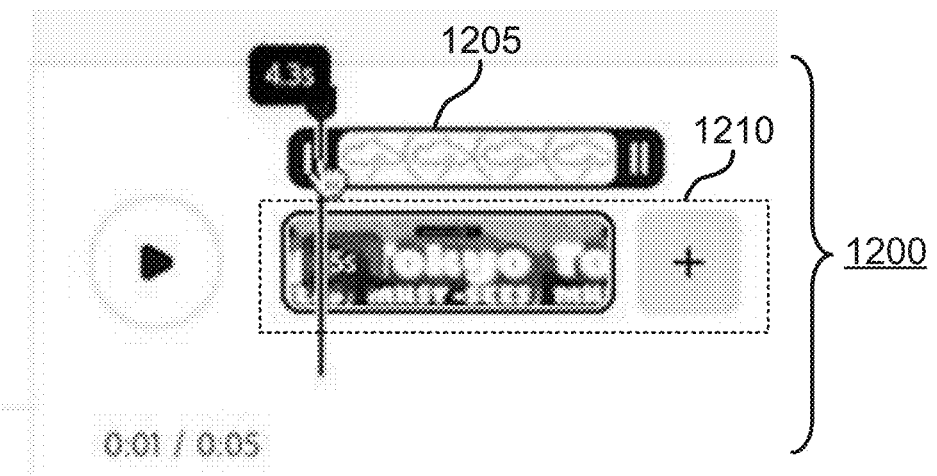
Figure 13:
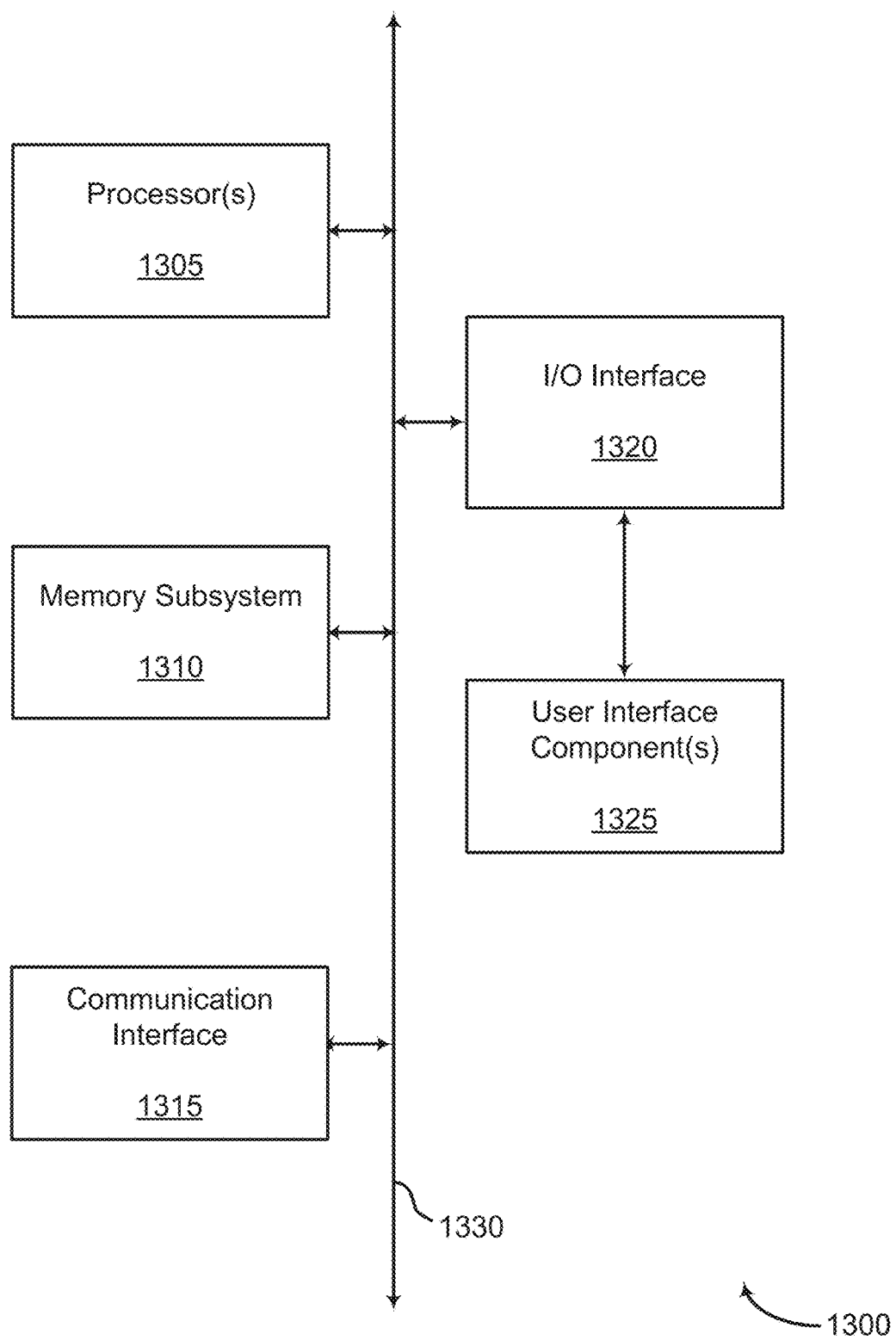
FIG. 13 shows an example of a computing device according to aspects of the present disclosure.

Further detail regarding the architecture of multimedia processing apparatus 110 is provided with reference to FIGS. 2 and 13. Further detail regarding the application and operation of multimedia processing apparatus 110 is provided with reference to FIGS. 3-12.

In some cases, multimedia processing apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses one or more microprocessors and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by user 100. The term "cloud" is sometimes used to describe data centers available to many users (e.g., user 100) over the Internet. Some large cloud networks have functions distributed over multiple locations from central servers. A server is designated an edge server if the server has a direct or close connection to a user (e.g., user 100). In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location. According to some embodiments, cloud 115 enables communication between user device 105, multimedia processing apparatus 110, and database 120.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user interacts with database controller. In other cases, database controller may operate automatically without user interaction. According to some embodiments, database 120 is external to multimedia processing apparatus 110 and communicates with multimedia processing apparatus 110 via cloud 115. According to some embodiments, database 120 is included in multimedia processing apparatus 110.

FIG. 2 shows an example of a multimedia processing apparatus 200 according to aspects of the present disclosure. The example shown includes multimedia processing apparatus 200, processor unit 205, memory unit 210, and media editing interface 215. Multimedia processing apparatus 200 is an example of, or includes aspects of, the corresponding element described with reference to FIG. 1.

Processor unit 205 is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or any combination thereof). In some cases, processor unit 205 is configured to operate a memory array using a memory controller. In other cases, a memory controller is integrated into the processor. In some cases, processor unit 205 is configured to execute computer-readable instructions stored in a memory to perform various functions. In some embodiments, processor unit 205 includes special-purpose components for modem processing, baseband processing, digital signal processing, or transmission processing. processor unit 205 is an example of, or includes aspects of, the processor described with reference to FIG. 13.

According to some embodiments, memory unit 210 includes instructions executable by a processor to perform certain functions. Examples of memory unit 210 include random access memory (RAM), read-only memory (ROM), or a hard disk. Examples of memory unit 210 include solid-state memory and a hard disk drive. In some examples, memory unit 210 is used to store computer-readable, computer-executable software including instructions that, when executed, cause a processor to perform various functions described herein. In some cases, memory unit 210 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within memory unit 210 store information in the form of a logical state. Memory unit 210 is an example of, or includes aspects of, the memory subsystem described with reference to FIG. 13.

According to some aspects, media editing interface 215 obtains a project file including page data for one or more pages, where each of the one or more pages includes a spatial arrangement of one or more media elements. In some examples, media editing interface 215 presents a page of the one or more pages based on the spatial arrangement. Media editing interface 215 presents a scene line adjacent to the page, where the scene line includes a temporal arrangement of one or more scenes within the page, and where the one or more media elements are temporally arranged within the one or more scenes.

In some examples, media editing interface 215 identifies a campaign including a set of projects. In some examples, media editing interface 215 presents the set of projects in the campaign. In some examples, media editing interface 215 receives a user input identifying a project from the set of projects, where the project file is obtained based on the user input.

In some examples, media editing interface 215 presents a page navigation element 220. Media editing interface 215 presents an additional page of the one or more pages based on the page navigation input. In some examples, the project file includes an ordering of the one or more pages.

In some examples, media editing interface 215 presents a page control element 225. In some examples, media editing interface 215 presents a temporal control element 230. Media editing interface 215 modifies a scene of the one or more scenes based on the temporal control input. In some examples, media editing interface 215 receives a media selection input selecting a media element of the one or more media elements. Media editing interface 215 presents a contextual track adjacent to the scene line based on the media selection input.

In some examples, media editing interface 215 receives media position input modifying a position of a media element of the one or more media elements. In some examples, media editing interface 215 presents the media element at the modified position within the page. In some examples, media editing interface 215 receives user input. In some examples, media editing interface 215 generates a modified project file based on the user input. In some examples, the modified project file includes a multiple scene video. In some examples, the modified project file includes a multiple page presentation.

According to some embodiments, media editing interface 215 presents content to a user including a page control element 225 for modifying a spatial arrangement of a page of the content and a temporal control element 230 for modifying a temporal arrangement of scenes located within the page; media editing interface 215 receives a page control input for editing the content via the page control element 225; media editing interface 215 receives a temporal control input for editing the content via the temporal control element 230; and media editing interface 215 generates modified content based on the page control input and the temporal control input. In some examples, media editing interface 215 generate a multiple scene video based on the temporal control input, where the modified content includes the multiple scene video.

In some examples, media editing interface 215 includes a page navigation element 220, a page control element 225, and a temporal control element 230. Media editing interface 215 is an example of, or includes aspects of, the corresponding element described with reference to FIGS. 6, 7, and 11.

According to some embodiments, page navigation element 220 receives a page navigation input. Page navigation element 220 is an example of, or includes aspects of, the corresponding element described with reference to FIGS. 6 and 7.

According to some embodiments, page control element 225 receives a page control input. In some examples, page control element 225 includes an add page element, a remove page element, a duplicate page element, a page size element, or a page orientation element. Page control element 225 is an example of, or includes aspects of, the corresponding element described with reference to FIGS. 5-7.

According to some embodiments, temporal control element 230 receives a temporal control input. In some examples, temporal control element 230 includes a video sequencing element, a video transition element, or a video pacing element. Temporal control element 230 is an example of, or includes aspects of, the corresponding element described with reference to FIG. 12.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

Media Editing and Content Generation

In FIGS. 3-13, a method, apparatus, and non-transitory computer readable medium for multimedia processing are described. One or more embodiments of the method, apparatus, and non-transitory computer readable medium include obtaining a project file comprising page data for one or more pages, wherein each of the one or more pages comprises a spatial arrangement of one or more media elements; presenting, via a media editing interface, a page of the one or more pages based on the spatial arrangement; and presenting, via the media editing interface, a scene line adjacent to the page, wherein the scene line comprises a temporal arrangement of one or more scenes within the page, and wherein the one or more media elements are temporally arranged within the one or more scenes.

Some examples of the method, apparatus, and non-transitory computer readable medium further include identifying a campaign comprising a plurality of projects. Some examples further include presenting the plurality of projects in the campaign. Some examples further include receiving a user input identifying a project from the plurality of projects, wherein the project file is obtained based on the user input.

Some examples of the method, apparatus, and non-transitory computer readable medium further include presenting a page navigation element in the media editing interface. Some examples further include receiving a page navigation input via the page navigation element. Some examples further include presenting, via the media editing interface, an additional page of the one or more pages based on the page navigation input. In some aspects, the project file comprises an ordering of the one or more pages.

Some examples of the method, apparatus, and non-transitory computer readable medium further include presenting a page control element in the media editing interface. Some examples further include receiving a page control input via the page control element. In some aspects, the page control element comprises an add page element, a remove page element, a duplicate page element, a page size element, or a page orientation element.

Some examples of the method, apparatus, and non-transitory computer readable medium further include presenting a temporal control element in the media editing interface. Some examples further include receiving a temporal control input via the temporal control element. Some examples further include modifying a scene of the one or more scenes based on the temporal control input. In some examples, the temporal control element comprises a video sequencing element, a video transition element, or a video pacing element.

Some examples of the method, apparatus, and non-transitory computer readable medium further include receiving a media selection input selecting a media element of the one or more media elements. Some examples further include presenting a contextual track adjacent to the scene line based on the media selection input.

Some examples of the method, apparatus, and non-transitory computer readable medium further include receiving media position input modifying a position of a media element of the one or more media elements. Some examples further include presenting the media element at the modified position within the page.

Some examples of the method, apparatus, and non-transitory computer readable medium further include receiving user input via the media editing interface. Some examples further include generating a modified project file based on the user input.

Some examples of the method, apparatus, and non-transitory computer readable medium further include publishing the modified project file to a social media platform. In some examples, the modified project file comprises a multiple scene video. In some examples, the modified project file comprises a multiple page presentation.

A method, apparatus, and non-transitory computer readable medium for multimedia processing are described. One or more embodiments of the method, apparatus, and non-transitory computer readable medium include presenting content to a user via a media editing interface including a page control element for modifying a spatial arrangement of a page of the content and a temporal control element for modifying a temporal arrangement of scenes located within the page; receiving a page control input for editing the content via the page control element; receiving a temporal control input for editing the content via the temporal control element; and generating modified content based on the page control input and the temporal control input.

Some examples of the method, apparatus, and non-transitory computer readable medium further include generating a multiple scene video based on the temporal control input, wherein the modified content includes the multiple scene video.

Figure 3:
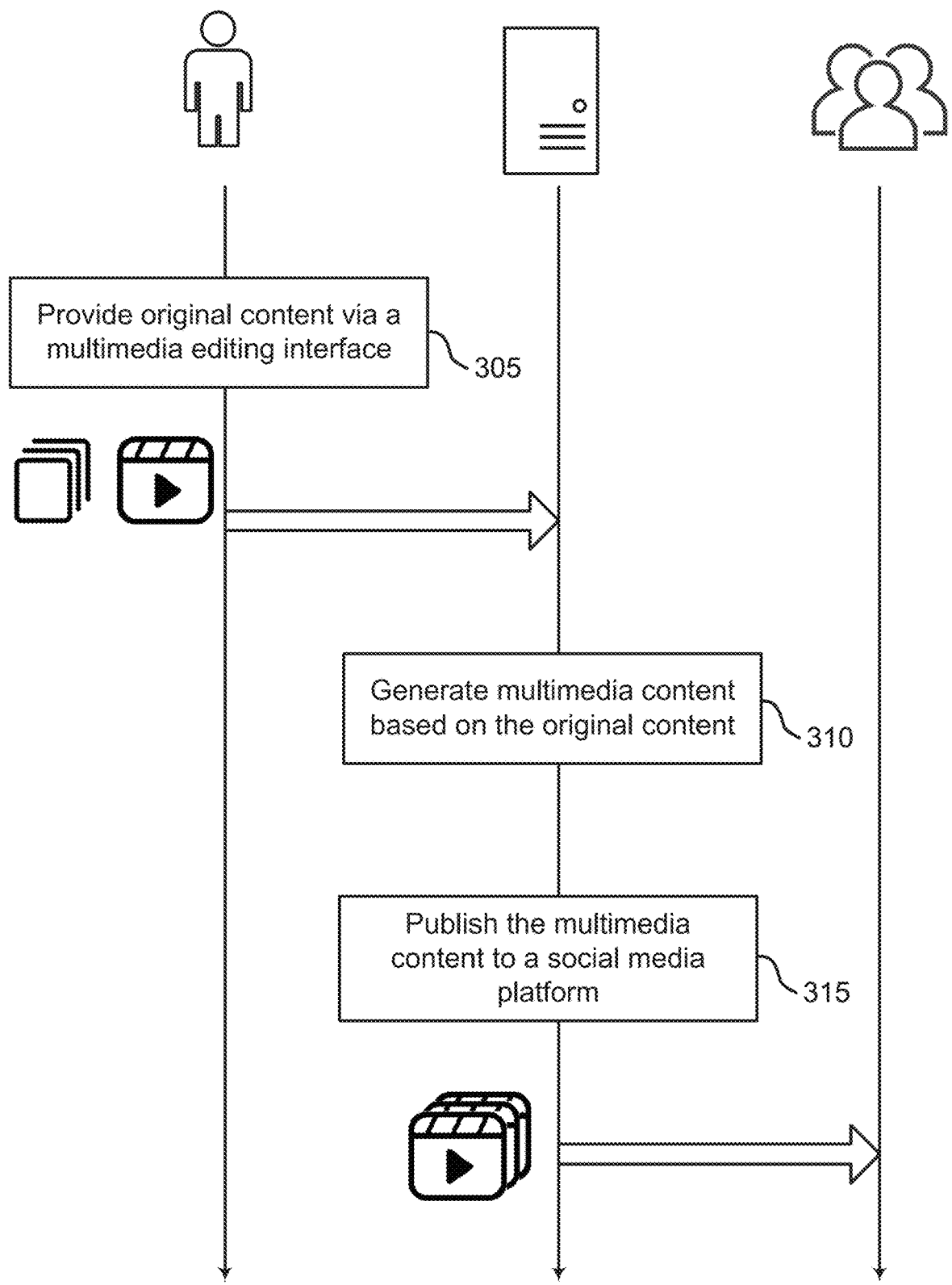
FIG. 3 shows an example of content editing and content generation according to aspects of the present disclosure.

FIG. 3 shows an example of content editing and content generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 305, the user provides original content via a multimedia editing interface. In some cases, the operations of this step refer to, or may be performed by, a user as described with reference to FIG. 1. Multimedia editing interface is an example of, or includes aspects of, media editing interface described with reference to FIGS. 1, 6, 7, and 11. For example, the user may upload original content (e.g., images, videos, audio tracks, etc.) via the multimedia editing interface. A first media content and a second media content are placed on a page in the multimedia editing interface, where the first media content and the second media content are temporally arranged on the page. In some cases, the user modifies the spatial arrangement of the first media content and the second media content. In some cases, the first media content is placed on a first page and the second media content is placed on a second page of the multimedia editing interface. The multimedia editing interface is also referred to as a media editing interface (described with reference to FIGS. 2, 6, 7, and 11).

At operation 310, the system generates multimedia content based on the original content. In some cases, the operations of this step refer to, or may be performed by, a multimedia processing apparatus as described with reference to FIGS. 1 and 2. For example, the multimedia processing apparatus generates multimedia content based on user input. User input is obtained via a page navigation element, a page control element, and/or a temporal control element. The page navigation element is used to select and navigate between one or more pages of a multimedia file (e.g., a media project file). Details regarding the page navigation element are described in detail with reference to FIGS. 6 and 7. The page control element is used to add a page, remove a page, zoom in on a page, zoom out on a page, duplicate a page, resize the aspect ratio of a page, and/or rotate a page. Details regarding the page control element are described in detail with reference to FIGS. 2 and 5-7.

In some examples, the temporal control element is used to control the length of a media element (e.g., a video file), arrange the sequence of multiple media elements (e.g., place a first video file temporally before a second video file), and/or manage the pacing of the media element. Details regarding temporal control element are described in detail with reference to FIGS. 2 and 12.

At operation 315, the system publishes the multimedia content to a social media platform. In some cases, the operations of this step refer to, or may be performed by, a multimedia processing apparatus as described with reference to FIGS. 1 and 2. For example, the multimedia content includes one or more pages. One of the one or more pages includes multiple video clips that are arranged temporally and sequentially within the page. In some examples, a page includes three scenes along a scene line such that the media editing interface can first play a first scene, then play a second scene, and lastly play a third scene without unintended interruption. For example, the transition from the first scene to the second scene and from the second scene to the third scene are seamless. The multimedia content is published onto a social media platform as a multimedia presentation or multimedia post, e.g., Instagram® Story presentation, cover photo, Instagram® post.

Figure 4:
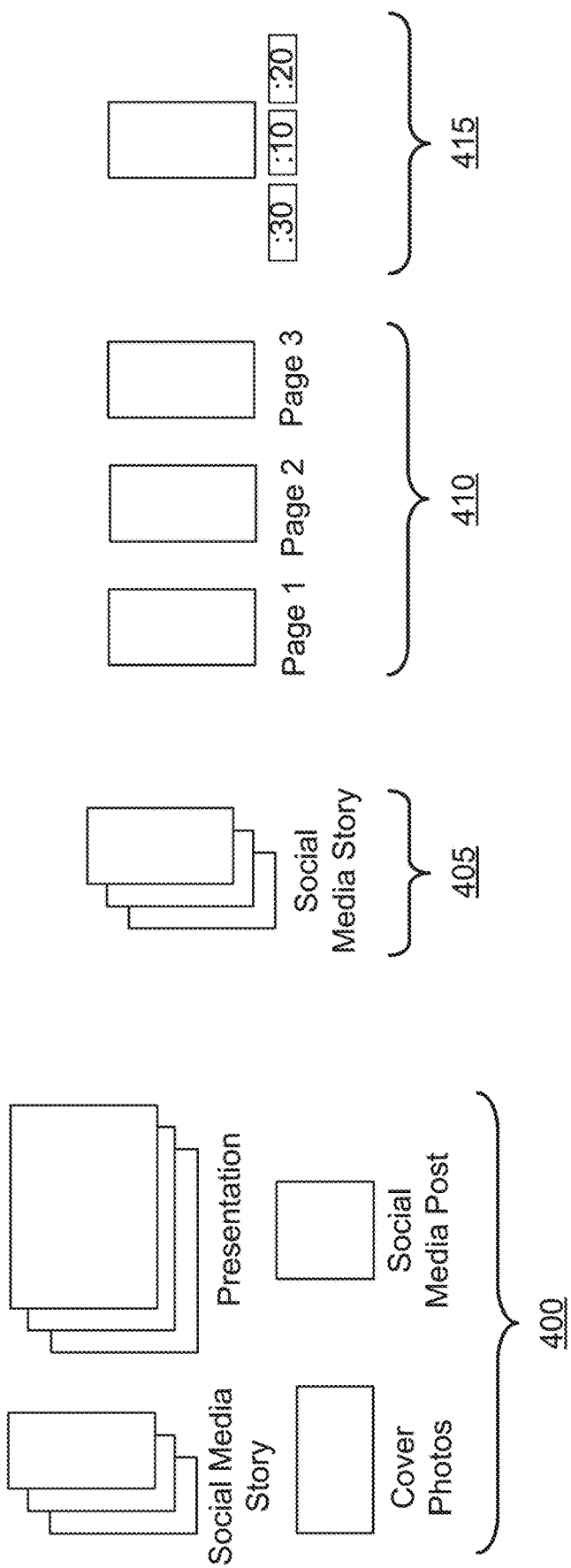
FIG. 4 shows an example of media elements according to aspects of the present disclosure.

FIG. 4 shows an example of media elements according to aspects of the present disclosure. The example shown includes campaign 400, project 405, page(s) 410, and scene 415. According to some embodiments of the present disclosure, a campaign 400 includes one or more projects 405. A project 405 includes one or more pages 410. A page 410 includes one or more scenes 415.

In an embodiment, the multimedia processing apparatus combines a set of media files (e.g., videos, images, text, captions, animation effects) to generate a media project file (e.g., multimedia content). The multimedia content, via a multimedia creation tool, is structured as a hierarchy of campaign 400, project 405, page(s) 410, and scene(s) 415. In some cases, the set of media files are uploaded and placed on page 410 for subsequent editing and arrangement. In some cases, the media project file is a continuous file including one or more pages of a mixture of static content (e.g., images) and dynamic content (e.g., video clips, sound, and animation effects). The media files include different file formats such as video file, audio file, image file, text, etc.

In some aspects, scene 415 refers to media elements (e.g., media files) with temporal aspects. For example, a scene 415, such as a video file, may have a duration of time (e.g., temporal aspect) when uploaded to the multimedia creation tool. In some cases, a scene 415, such as an image, may not have a duration of time. However, the multimedia creation tool applies a temporal aspect to the scene 415. In some cases, aspect ratio of the scene 415 can be modified by a user input or the multimedia creation tool.

In some aspects, page 410 refers to a canvas of the multimedia creation tool, where one or more scenes may be uploaded to the canvas. A page 410 is an organizing function within a project. In some cases, pages can have different aspect ratios. In some embodiments, the page 410 includes one or more scenes that are temporally arranged. A scene line is presented adjacent to the page 410, wherein the scene line includes a temporal arrangement of one or more scenes 415 on the page 410. For example, page 1 of pages 410 includes a first scene and a second scene. The first scene is temporally placed before the second scene. Page 2 of pages 410 includes a third scene, a fourth scene, and a fifth scene. The third scene is temporally placed before the fourth scene, which is temporally placed before the fifth scene. In some cases, page 1 is temporally placed before page 2. For example, the first scene and the second scene are temporally placed before the third scene, the fourth scene, and the fifth scene.

In some embodiments, project 405 refers to a compilation of one or more pages. In some embodiments, project 405 includes one or more pages 410 that are temporally arranged. In some embodiments, pages 410 of project 405 have different aspect ratios.

In some embodiments, campaign 400 refers to a set of mixed media output use cases. The set of mixed media output use cases are used as sample templates for a project 405 to be generated. For example, a campaign may include a media output of a social media story, presentation, cover photo, and social media post. In some examples, the social media story is Instagram® story and the social media post is Instagram® post.

Project 405 is an example of, or includes aspects of, the corresponding element described with reference to FIG. 5. Page 410 is an example of, or includes aspects of, the corresponding element described with reference to FIGS. 6, 7, and 11. Scene 415 is an example of, or includes aspects of, the corresponding element described with reference to FIG. 7.

Figure 5:
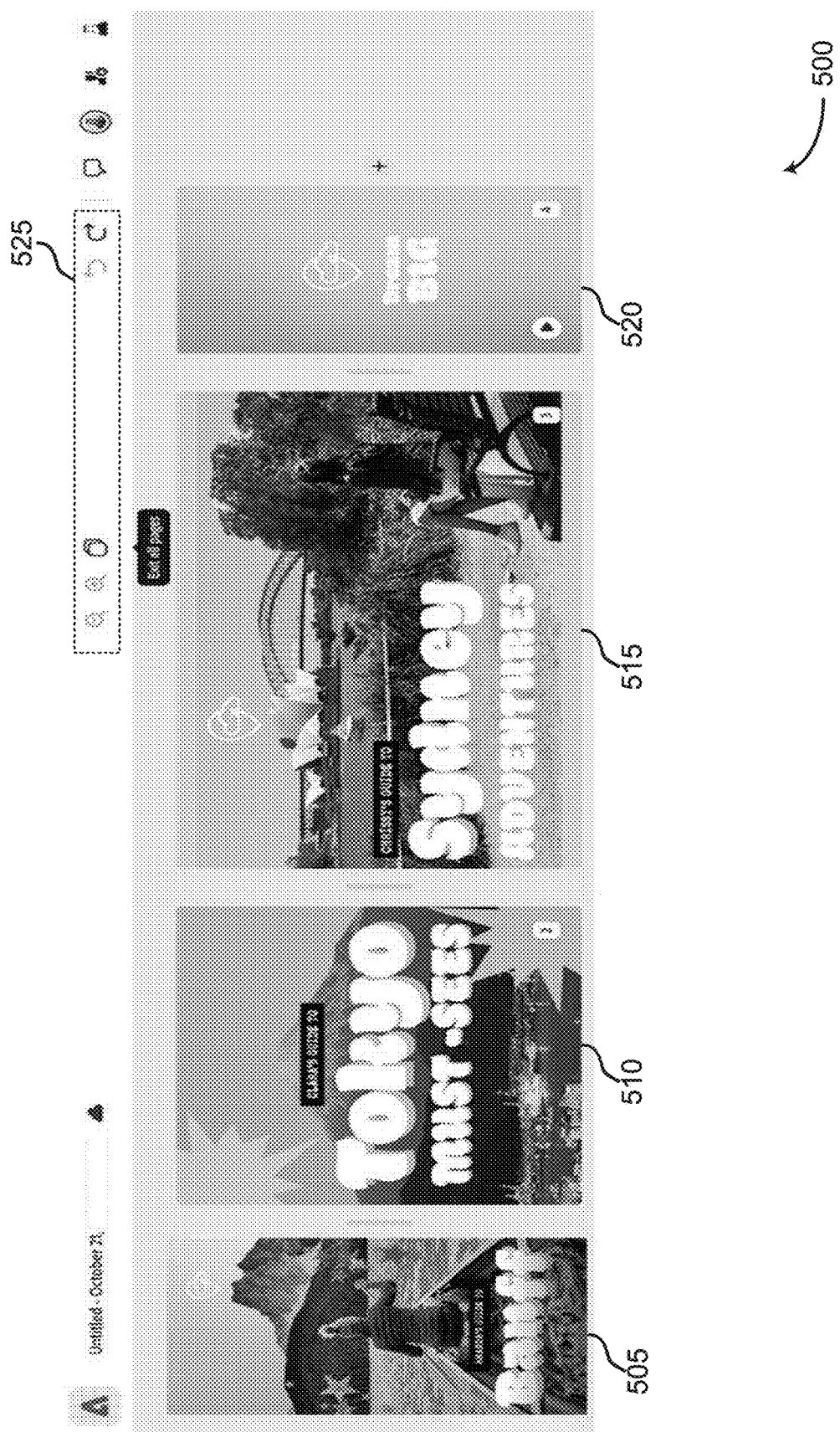
FIG. 5 shows an example of a multimedia campaign according to aspects of the present disclosure.

FIG. 5 shows an example of a multimedia campaign according to aspects of the present disclosure. The example shown includes project 500, first page 505, second page 510, third page 515, fourth page 520, and page control element 525. In some cases, project 500 includes multiple pages having different aspect ratios and different contents. In some cases, project 500 may be a continuous media file (e.g., first to fourth pages may be displayed to a user without delay).

Referring to the example shown in FIG. 5, project 500 includes four pages. First page 505 includes static content. For example, first page 505 includes an image of a lady on a kayak, which includes one or more scenes. Text "Banff" is located at the bottom of first page 505. Mountain is placed at the upper portion of first page 505. Star shape patterns are added to surround the lady in first page 505. First page 505 is an Instagram® Story.

Second page 510 includes media content with temporal aspects. Second page 510 includes an image of Fuji Mountain. Second page 510 includes one or more scenes that are temporally arranged. In some examples, second page 510 includes an Instagram® Post. A first media object within a scene is a static image depicting Fuji Mountain. A second media object is a polygonal shape spatially arranged at the upper left corner of second page 510. The second media object is presented for the first 3 seconds (i.e., 0 s-3 s) together with the scene. A third media object is a polygonal shape spatially arranged at the bottom right corner of second page 510. The third media object is presented for the first 3 seconds (i.e., 0 s-3 s). A fourth media object is "Tokyo must-sees" caption. The fourth media object begins at the first second and lasts for 3 seconds (i.e., 1 s-4 s). The fourth media object appears after the first media object, the second media object, and the third media object. Accordingly, the one or more media elements are temporally arranged within the scene on second page 510. The one or more media elements are multimedia content (e.g., text, caption, image, audio, video, animation effects) and are associated with corresponding temporal aspects.

In some examples, third page 515 is a Twitter® Graphic. Third page 515 includes similar types of media elements and scene(s) as described above with respect to second page 510.

In some examples, fourth page 520 includes a video story including one or more scenes. Fourth page 520 includes similar types of media elements and scene(s) as described above with respect to second page 510. Page control element 525 is used to add a page, remove a page, zoom in on a page, zoom out of a page, duplicate a page, resize the aspect ratio of a page, and/or rotate a page in project 500.

Project 500 is an example of, or includes aspects of, the corresponding element described with reference to FIG. 4. Page control element 525 is an example of, or includes aspects of, the corresponding element described with reference to FIGS. 2, 6, and 7.

Figure 6:
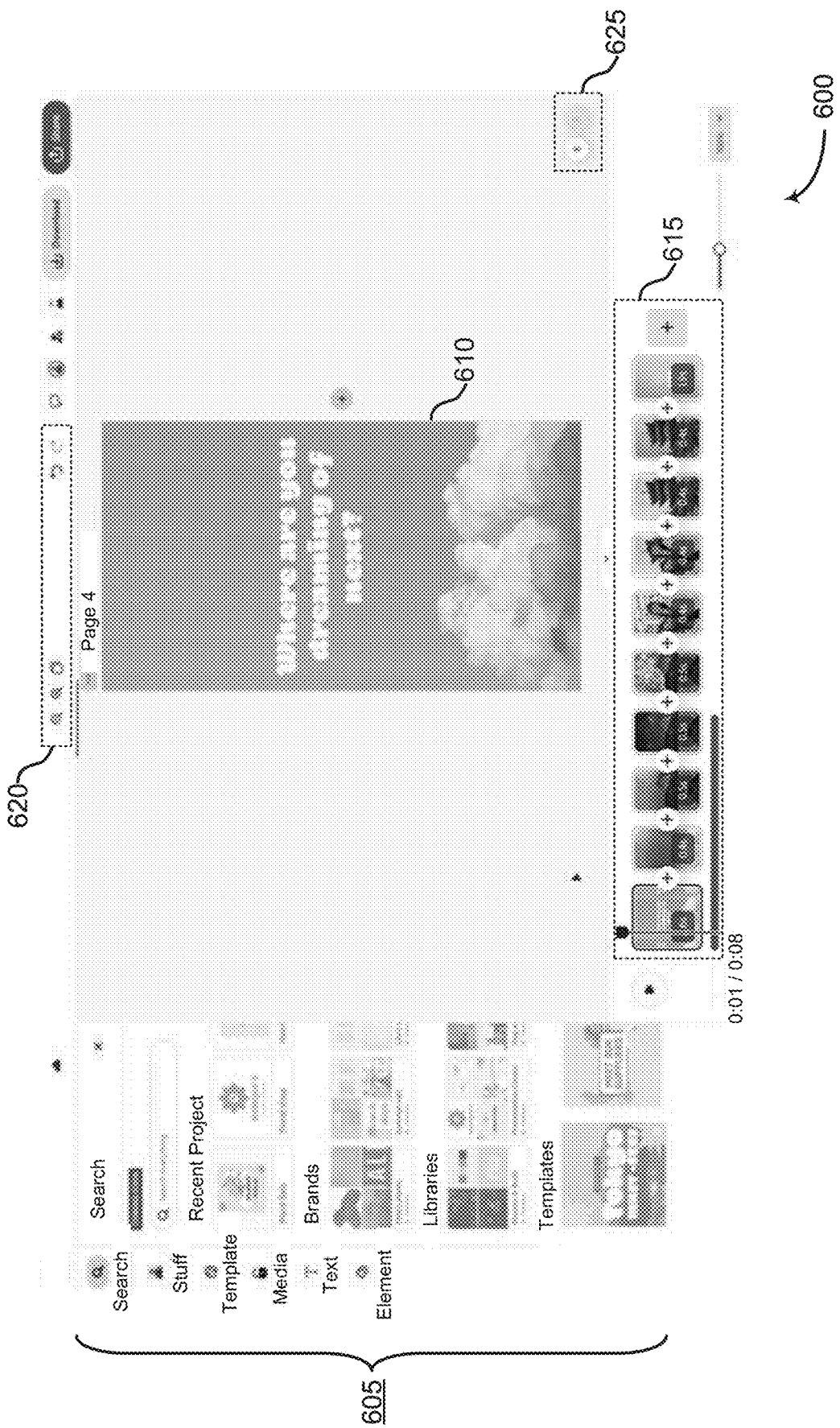
FIGS. 6 and 7 show examples of a media editing interface according to aspects of the present disclosure.

FIG. 6 shows an example of a media editing interface according to aspects of the present disclosure. The example shown includes media editing interface 600, page content panel 605, page 610, scene line 615, page control element 620, and page navigation element 625.

According to some embodiments of the present disclosure, static contents can be added to and placed on page 610. Static content relates to media elements that are not associated with a temporal aspect. contents (e.g., contents without temporal aspects and contents with temporal aspects) can be added to one or more pages of the multimedia creation tool (e.g., media editing interface 600). When a scene (e.g., a first scene) is added to page 610, a temporal control element is displayed in media editing interface 600. In some cases, a second scene is added to the same page (e.g., page 610). The second scene is temporally arranged with respect to the first scene (e.g., the first scene and the second scene are sequentially displayed to a user). In some cases, an object (e.g., a third scene or a media element) is added to the same page (e.g., page 610), and a user can assign a temporal aspect to the object.

Referring to FIG. 6, page content panel 605 provides various tools. For example, a user can select a template (e.g., social media story, presentation, cover letter, etc.) from page content panel 605. Additionally, page content panel 605 enables accessing a recent project, a brand, library resources, media file text, images, videos, audio, shapes, etc.

In the example shown in FIG. 6, page 610 includes multiple scenes. When one or more scenes are added onto page 610, scene line 615 is displayed on media editing interface 600. Scene line 615 includes a total of ten scenes for page 610. Scenes have a corresponding temporal aspect. For example, the first scene of scene line 615 is presented for 2.6 seconds, the second scene is presented for 0.4 seconds after the first scene, the third scene is presented for 0.5 seconds after the second scene, etc. Scenes include static content (e.g., an image) and/or dynamic content (e.g., a video clip, animation effects). In an embodiment, scenes have a same aspect ratio as the aspect ratio of page 610. In some cases, scenes have different aspect ratios among each other. Further detail regarding the scene line is described with reference to FIG. 10. Page 610 is an example of, or includes aspects of, the corresponding element described with reference to FIGS. 4, 7, and 11. Scene line 615 is an example of, or includes aspects of, the corresponding element described with reference to FIGS. 10 and 12.

In some embodiments, page control element 620 is used to add a page, remove a page, zoom in on a page, zoom out of a page, duplicate a page, resize the aspect ratio of a page, and/or rotate a page. Page navigation element 625 is used to select and/or navigate between one or more pages of a project file. In the example shown in FIG. 6, the user navigates to page 4 using page navigation element 625 on media editing interface 600.

Media editing interface 600 is an example of, or includes aspects of, the corresponding element described with reference to FIGS. 2, 7, and 11. Page control element 620 is an example of, or includes aspects of, the corresponding element described with reference to FIGS. 2, 5, and 7. Page navigation element 625 is an example of, or includes aspects of, the corresponding element described with reference to FIGS. 2 and 7.

Figure 7:
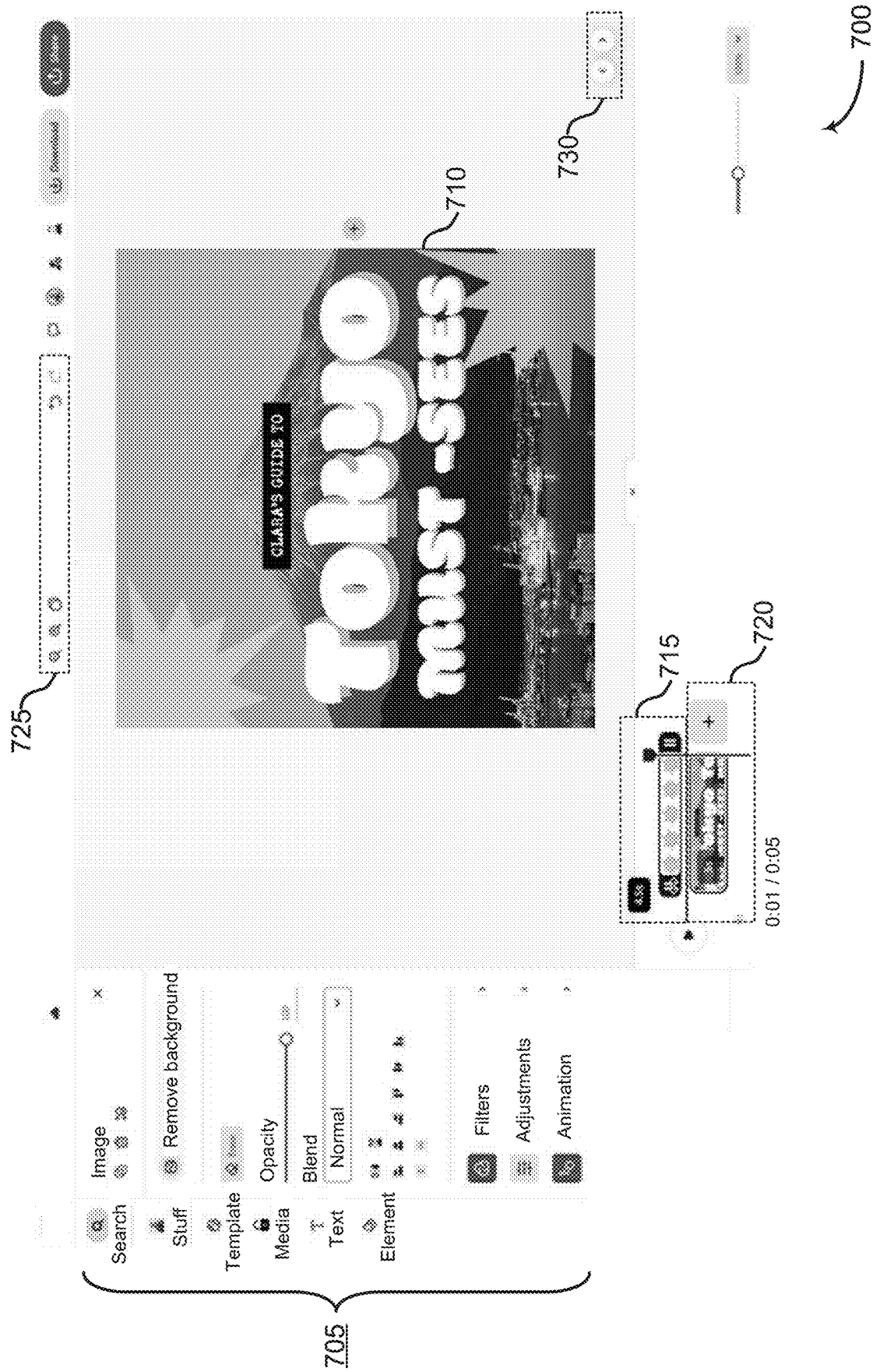

FIG. 7 shows an example of a media editing interface according to aspects of the present disclosure. The example shown includes media editing interface 700, object property panel 705, page 710, contextual track 715, scene 720, page control element 725, and page navigation element 730.

FIG. 7 shows an example of a media editing interface when an object or a scene on page 710 is selected. For example, a user selects the polygonal shape at the upper left corner of page 710. Media editing interface 700 displays object property panel 705 in connection with the selected object (i.e., the polygonal shape on page 710). Media editing interface 700 also presents contextual track 715 and scene 720. Object property panel 705 is used to add animation to an object, manage a style of the object, add filters to the object, etc. In some cases, when an animation is applied to an object, the user can further select an "in animation", "looping animation", or "out animation". When animation is added to the scene (e.g., scene 720), a play head may be displayed on the bottom of media editing interface 700 for the user to preview the animation.

According to some embodiments, a scene line is disposed adjacent to page 710, where the scene line includes a temporal arrangement of one or more scenes within the page. A temporal control element is configured to manage the temporal aspect of scene 720 (e.g., adjust temporal length of scene 720, or rearrange the ordering of a sequence of scenes on page 710). Scene 720 is an example of, or includes aspects of, the corresponding element described with reference to FIG. 4.

In an example shown in FIG. 7, a scene line includes temporal arrangement of scene 720. Contextual track 715 is presented next to scene 720. In some cases, additional scenes are added by selecting the "+" button. In some cases, when an object is selected, the temporal features of the object are managed or modified via contextual track 715. For example, the user selects the polygonal shape object located at the upper left corner of media editing interface 700. The user drags either end of contextual track 715 to adjust the start time, length of appearance, and end time of the polygonal shape object with respect to scene 720. For example, scene 720 is 5 seconds long. Contextual track 715 is modified to start at the same time as scene 720 and lasts 4.5 seconds. Accordingly, the polygonal shape object appears at the same time scene 720 begins to play. The polygonal shape object stops or disappears after 4.5 seconds while scene 720 keeps playing. Contextual track 715 is an example of, or includes aspects of, the corresponding element described with reference to FIGS. 11 and 12. Further detail regarding modifying a scene is described with reference to FIG. 12.

In some embodiments, page control element 725 is used to add a page, remove a page, zoom in on a page, zoom out of a page, duplicate a page, resize the aspect ratio of a page, and/or rotate a page. Page navigation element 730 is used to select and/or navigate between one or more pages of a project file.

In some cases, opening a project opens a display region that shows all of the pages of the project. Page navigation element 730 may be provided for navigating between pages (e.g., forward and back, or spatial navigation based on the arrangement of the pages). In some cases, media content may be moved from one page to another page, e.g., using a drag-and-drop technique.

Media editing interface 700 is an example of, or includes aspects of, the corresponding element described with reference to FIGS. 2, 6, and 11. Page 710 is an example of, or includes aspects of, the corresponding element described with reference to FIGS. 4, 6, and 11. Page control element 725 is an example of, or includes aspects of, the corresponding element described with reference to FIGS. 2, 5, and 6. Page navigation element 730 is an example of, or includes aspects of, the corresponding element described with reference to FIGS. 2 and 6.

Figure 8:
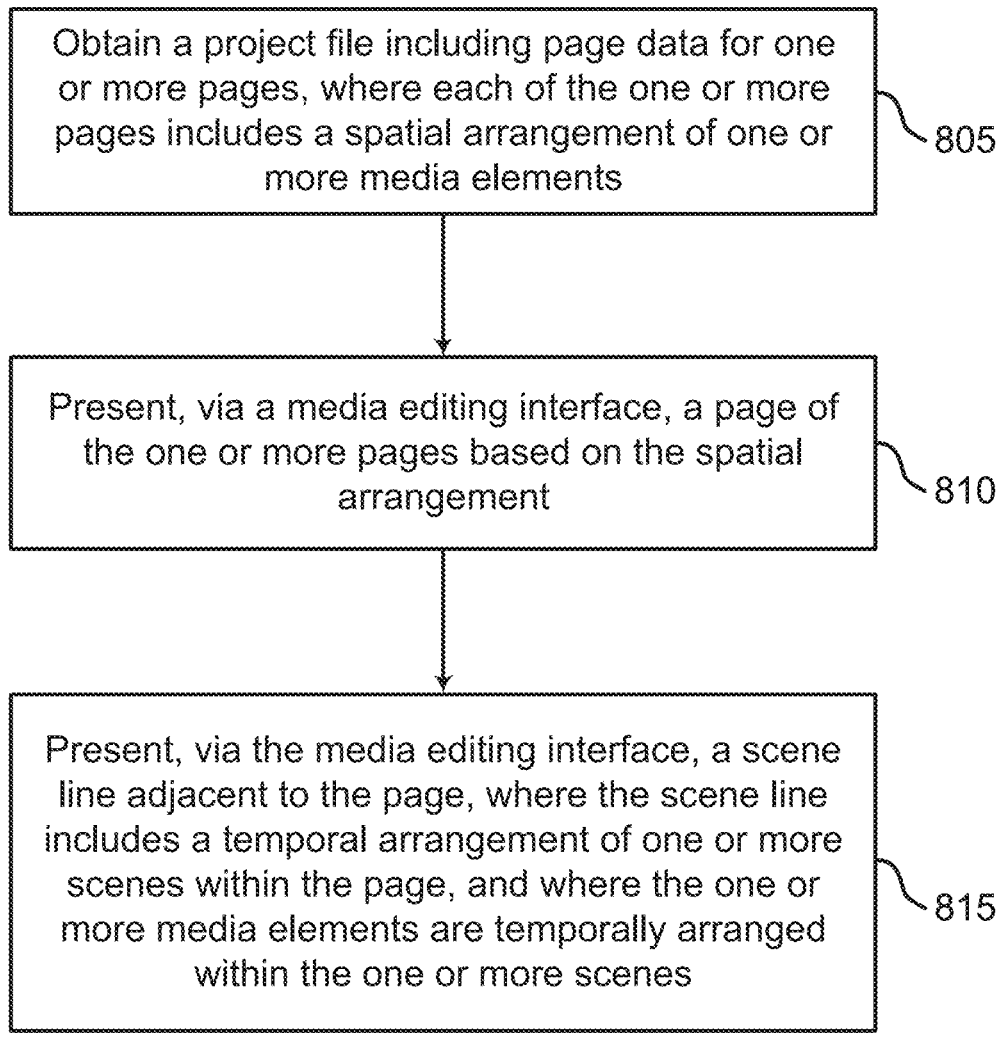
FIG. 8 shows an example of a method for multimedia processing according to aspects of the present disclosure.

FIG. 8 shows an example of a method for multimedia processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system opens a project file including page data for one or more pages, where each of the one or more pages includes a spatial arrangement of one or more media elements. In some cases, the operations of this step refer to, or may be performed by, a media editing interface as described with reference to FIGS. 2, 6, 7, and 11. For example, a user can open a project file using different preset templates or custom templates. The user can add or delete pages using the add button of the page control element. In some cases, each of the pages is temporally arranged with another page. The user may add one or more media elements and/or one or more scenes (e.g., image, text, audio data, video sequences, etc.) on the page(s). In some cases, the user can modify the aspect ratio (e.g., size) of the media element and the scene within the page. In some cases, media elements are spatially arranged on the page. For example, a media object can be placed at the top corner of the page and where a scene covers the whole page.

In some cases, media elements may have different medial file format. The media elements include an image, text, audio, video, animation effect, etc. Different types of media elements may be incorporated and placed within a same page or different pages.

In some cases, the term "page" refers to a canvas of the multimedia creation tool. A page is an organizing unit or an editing unit within a project. In some cases, multiple pages may have different aspect ratios and/or orientations. One or more scenes can be placed within a same page.

Examples of page are described with reference to FIG. 5. Detail on page control element is described with reference to FIGS. 6 and 7. Examples of spatial arrangement of media object are described with reference to FIGS. 7 and 11.

At operation 810, the system displays, via a media editing interface, a page of the one or more pages based on the spatial arrangement. In some cases, the operations of this step refer to, or may be performed by, a media editing interface as described with reference to FIGS. 2, 6, 7, and 11. In some cases, a user navigates to a target page to modify the spatial arrangement of the one or more media elements within the target page.

In some cases, the term "scene" refers to a composite multimedia content associated with temporal aspect. A scene may include one or more media elements of various types. The one or more media elements have corresponding temporal aspects. For example, a scene includes a video clip having a duration of time (i.e., temporal aspect). The scene also includes a background image that is static. The scene also includes an animation effect related to a media object, e.g., a star shape. The star shape pops up after playing the video clip and the star shape lasts for a few seconds. For example, the animation effect related to the media object is presented after the video clip temporally. In some examples, aspect ratio (e.g., size) of a scene can be adjusted.

In some cases, the term "spatial arrangement" refers to the location of one or more media elements within a page or a scene. For example, a first media element (an image) is spatially arranged at a top left corner of a page. A second media element (text) is spatially arranged at the bottom of the page. A third media element (a video) is spatially arranged in the middle of the page.

In some cases, the term "project" refers to a compilation of one or more pages. In some cases, the term "campaign" refers to a compilation of one or more projects. A campaign includes a set of mixed media output use cases. A campaign includes a social media story, a presentation, a cover photo, and/or a social media post.

At operation 815, the system displays, via the media editing interface, a scene line adjacent to the page, where the scene line includes a temporal arrangement of one or more scenes within the page, and where the one or more media elements are temporally arranged within the one or more scenes. In some cases, the operations of this step refer to, or may be performed by, a media editing interface as described with reference to FIGS. 2, 6, 7, and 11.

In some cases, when one or more scenes are on the page, the scene line is displayed to the user. A scene line shows a timeline of thumbnail images representing different temporal points in a scene associated with the page. In some cases, the scene line includes one or more scenes on the page. In some embodiments, the media editing interface displays a contextual track adjacent to the scene line, where the contextual track represents temporal aspect of the media object. Detail on an example of a scene line is further described with reference to FIGS. 6, 7, 10 and 11.

In some cases, the term "temporal arrangement" refers to arranging temporal aspects corresponding to one or more scenes on a scene line. For example, a first scene is presented for a duration of five seconds and a second scene is presented after the first scene for a duration of three seconds. A temporal control element of the media editing interface is used to edit temporal arrangement of multiple scenes.

Figure 9:
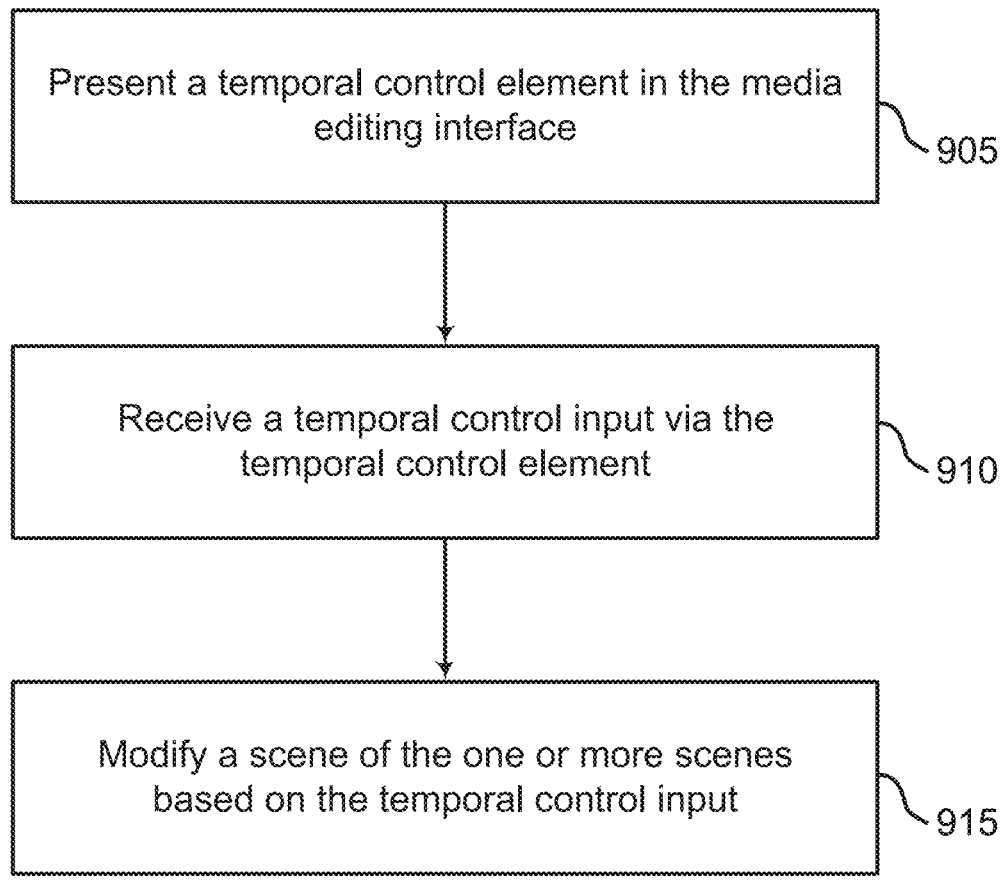
FIG. 9 shows an example of a method for modifying a scene based on temporal control according to aspects of the present disclosure.

FIG. 9 shows an example of a method for modifying a scene based on temporal control according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system displays a temporal control element in the media editing interface. In some cases, the operations of this step refer to, or may be performed by, a media editing interface as described with reference to FIGS. 2, 6, 7, and 11. In some examples, the temporal control element includes a contextual track in relation to a media object (e.g., a star shape) and a scene line comprising one or more scenes. The temporal control element is described in greater detail with reference to FIGS. 10 and 12.

At operation 910, the system receives a temporal control input via the temporal control element. In some cases, the operations of this step refer to, or may be performed by, a temporal control element as described with reference to FIGS. 2 and 12. In some cases, the temporal control element is used to modify temporal aspects of media elements and scenes. Details on modifying a temporal aspect of media file is described with reference to FIG. 12.

At operation 915, the system modifies a scene of the one or more scenes based on the temporal control input. In some cases, the operations of this step refer to, or may be performed by, a media editing interface as described with reference to FIGS. 2, 6, 7, and 11. In some examples, the temporal control input is based on a user input.

Figure 10:
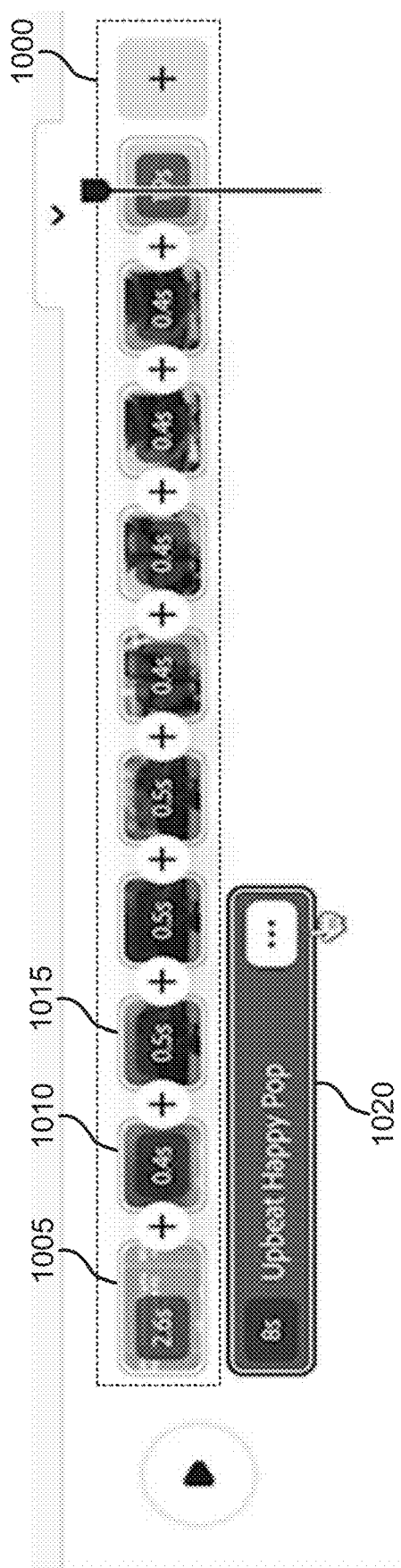
FIG. 10 shows an example of a scene line according to aspects of the present disclosure.

FIG. 10 shows an example of a scene line 1000 according to aspects of the present disclosure. The example shown includes scene line 1000, first scene 1005, second scene 1010, third scene 1015, and media file 1020.

According to some embodiments of the present disclosure, scene line 1000 is presented within a page or adjacent to a page (e.g., page 710 with reference to FIG. 7). Scene line 1000 shows a temporal arrangement of a set of scenes, where scenes are represented by corresponding thumbnail images. The thumbnail images represent a representative frame. A user can add different scenes (e.g., video content) to the page. In the example shown in FIG. 10, scene line 1000 includes first scene 1005, second scene 1010, third scene 1015, and additional scenes that are omitted for brevity.

When a page is selected within a project, various editing tools may be presented. The editing tools that are made available may depend on the type of content within the page. For example, if a page includes video content, a navigation element may be displayed for opening and closing a scene line interface (e.g., to display scene line 1000) for viewing and editing video associated with the page.

In some embodiments, scene line 1000 displays a thumbnail representation comprising a sequence of thumbnails representing a view of the page at selected points in time. A "play" button (e.g., located on the left side of scene line 1000) is displayed next to scene line 1000 and a "plus" button (e.g., located on the right side of the last scene on scene line 1000) is displayed for adding additional content (e.g., adding one or more additional scenes). Alternatively, media content can be dragged onto the page and a corresponding scene is automatically added to scene line 1000.

Videos can be added to a page and edited using tools integrated into scene line 1000. For example, the video start time can be edited, and a clip of the video can be shown on the main page while other parts of the video (either temporal or spatial parts) are hidden. In some cases, a contextual track is displayed adjacent to scene line 1000. The contextual track can indicate the status of an individual element (or object) of the page at different points in time, and the individual element is aligned with scene line 1000. For example, a static element can be displayed during part of a video, and then removed (or hidden from view). Contextual track is an example of, or includes aspects of, the corresponding element described with reference to FIGS. 7, 11, and 12.

Accordingly, scene line 1000 can be nested or embedded in a page-based interface such that scene line 1000 relates to the temporal progression of one or more scenes within a page. Scenes within the page are associated with corresponding media files (e.g., video files). In some examples, a set of media files of a same project are associated with one continuous media file within or presented by the media editing interface. That is, the set of media files are arranged along scene line 1000 and they altogether form an aggregate media output, e.g., a sequence of videos.

In the example illustrated in FIG. 10, scene line 1000 includes a temporal arrangement of ten scenes. For example, scene line 1000 displays a sequence of thumbnail images representing a sequence of ten different scenes. Scenes have a corresponding temporal aspect such that the total temporal length of the ten scenes is 8 seconds long. First scene 1005 includes a video clip that is 2.6 seconds long. Second scene 1010 includes a video clip that is 0.4 seconds long. Third scene 1015 includes a video clip that is 0.5 seconds long.

In some cases, a scene includes dynamic content (e.g., video, animation effects, audio), static content (e.g., image, text, caption), or a combination thereof. In some embodiments, media file 1020 is added to scene line 1000. For example, media file 1020 is an audio track that is played along with the scenes. The audio track lasts for 8 seconds, equal to the total temporal length of the ten scenes.

Scene line 1000 is an example of, or includes aspects of, the corresponding element described with reference to FIGS. 6 and 12. First scene 1005 is an example of, or includes aspects of, the corresponding element described with reference to FIG. 11. Second scene 1010 is an example of, or includes aspects of, the corresponding element described with reference to FIG. 11.

Figure 11:
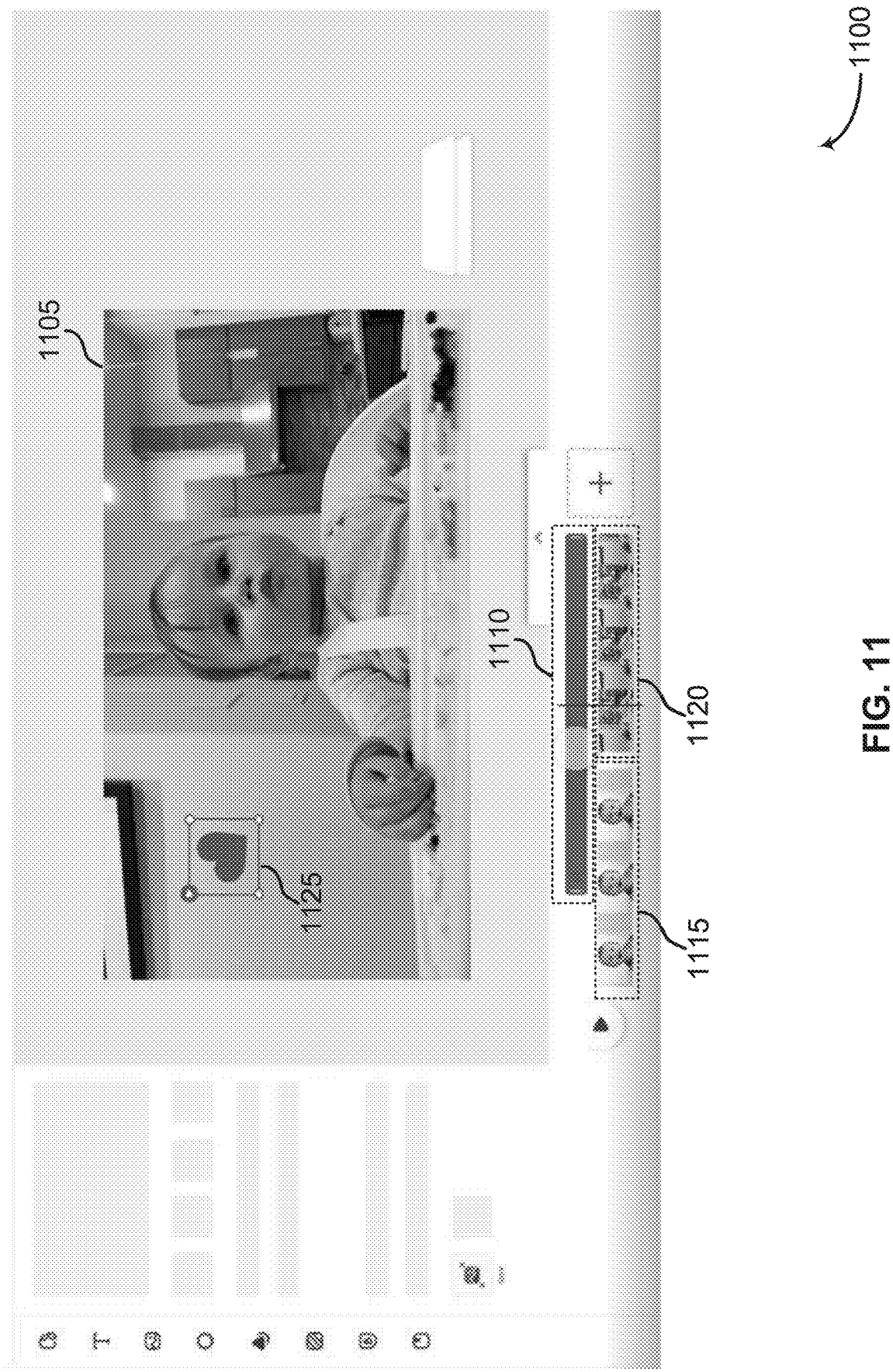
FIG. 11 shows an example of modifying a scene according to aspects of the present disclosure.

FIG. 11 shows an example of modifying a scene according to aspects of the present disclosure. The example shown includes media editing interface 1100, page 1105, contextual track 1110, first scene 1115, second scene 1120, and media object 1125.

FIG. 11 shows a media editing interface 1100 with page 1105 and a scene line including a temporal arrangement of first scene 1115 and second scene 1120 within page 1105. A temporal control element is used to manage scenes within page 1105 (e.g., add a scene, remove a scene, rearrange ordering of scenes). The temporal control element includes a video sequencing element, a video transition element, or a video pacing element. Editing elements on the left hand side of media editing interface 1100 are used to add or modify media content on page 1105.

In an embodiment, media editing interface 1100 includes a display region for displaying pages of a project (e.g., page 1105 shows a baby inside a room). When page 1105 is selected, page 1105 may be highlighted or displayed in full contrast, whereas non-selected pages may be blurred, greyed, hidden, or partially obscured.

Multiple pages can be displayed in a carousel, or in a spatial arrangement. The pages of a project may be linked structure-based with a sequential order or a spatial arrangement. Each page may have metadata including a page size, margins, layout, and a list of elements included in the page.

Referring to FIG. 11, a scene line is located at the bottom of media editing interface 1100. The scene line includes contextual track 1110, first scene 1115, and second scene 1120. Multiple elements (dynamic or static) may be added and spatially arranged (e.g., positioned) within page 1105. In some cases, a "stack" sign next to page 1105 indicates the set of scenes within page 1105 (e.g., two layers stacked indicating two scenes in page 1105).

As shown in FIG. 11, contextual track 1110 is a temporal representation corresponding to media object 1125. Media object 1125 may be added to page 1105 via editing elements at the left side of media editing interface 1100. When media object 1125 is selected, contextual track 1110 is presented adjacent to the scene line. For example, the scene line includes a temporal arrangement of first scene 1115 and second scene 1120. In some cases, the temporal length of contextual track 1110 can be adjusted based on the temporal aspect of first scene 1115 and second scene 1120. As shown in the example, media object 1125, via contextual track 1110, appears in the middle of first scene 1115. Media object 1125 is presented throughout the rest of the duration of first scene 1115 and the entire duration of second scene 1120. For example, first scene 1115 lasts for 8 seconds and second scene 1120 lasts for 6 seconds. Media object 1125 is displayed along with first scene 1115 at the fourth second (e.g., t=4 s) of first scene 1115 until the end of the first scene (e.g., t=8 s) and continues to display along with second scene 1120. Media object 1125 is terminated when the duration of second scene 1120 is terminated (e.g., t=14 s). The temporal aspect of media object 1125 is modified by managing contextual track 1110 (e.g., drag contextual track 1110 to increase or decrease temporal length of media object 1125 being presented). Accordingly, media editing interface 1100 generates multimedia content (e.g., a video output) based on first scene 1115, second scene 1120, and media object 1125 within page 1105. Contextual track 1110 is an example of, or includes aspects of, the corresponding element described with reference to FIGS. 7 and 12.

Media editing interface 1100 is an example of, or includes aspects of, the corresponding element described with reference to FIGS. 2, 6, and 7. Page 1105 is an example of, or includes aspects of, the corresponding element described with reference to FIGS. 4, 6, and 7. First scene 1115 is an example of, or includes aspects of, the corresponding element described with reference to FIG. 10. Second scene 1120 is an example of, or includes aspects of, the corresponding element described with reference to FIG. 10.

FIG. 12 shows an example of modifying temporal aspect of a media file according to aspects of the present disclosure. The example shown includes temporal control element 1200, contextual track 1205, and scene line 1210. In some examples, temporal control element 1200 includes contextual track 1205 and scene line 1210.

In an embodiment, the temporal aspect (e.g., time length) of a media object within a page can be modified. For example, scene line 1210 represents a temporal arrangement of one or more scenes within a page. Contextual track 1205 is used to manage a media object within the page. Contextual track 1205 includes a set of thumbnail images that relate to the media object. The temporal aspect of the media object is modified by dragging the toolbar of contextual track 1205. For example, the beginning time, the end time, and temporal length can be modified via contextual track 1205.

An example in the top portion of FIG. 12 shows that a scene is 5 seconds long and a media object (e.g., a polygonal shape) is presented for 4.5 seconds. An example in the bottom portion of FIG. 12 shows the same scene, where the media object is modified to display for 4.3 seconds. Accordingly, the scene is displayed first for 0.7 seconds and then the media object begins to appear at 0.7 seconds and is displayed for 4.3 seconds along with the scene.

Additionally or alternatively, the user can drag the toolbar on the right side of contextual track 1205. In some cases, contextual track 1205 is used to extend the temporal length of the media object or shorten the temporal length of the media object. The media object may be presented along with the scene. In some cases, the media object is presented without the scene when the scene ends earlier than the media object. Accordingly, temporal aspects of media objects can be modified via temporal control element 1200.

Temporal control element 1200 is an example of, or includes aspects of, the corresponding element described with reference to FIG. 2. Contextual track 1205 is an example of, or includes aspects of, the corresponding element described with reference to FIGS. 7 and 11. Scene line 1210 is an example of, or includes aspects of, the corresponding element described with reference to FIGS. 6 and 10.

FIG. 13 shows an example of a computing device 1300 according to aspects of the present disclosure. The example shown includes computing device 1300, processor 1305, memory subsystem 1310, communication interface 1315, I/O interface 1320, user interface component 1325, and channel 1330.

In some embodiments, computing device 1300 is an example of, or includes aspects of, the multimedia processing apparatus 110 as described with reference to FIGS. 1-2. In some embodiments, computing device 1300 includes one or more processors 1305 that can execute instructions stored in memory subsystem 1310 to obtain a project file comprising page data for one or more pages, where each of the one or more pages comprises a spatial arrangement of one or more media elements; present, via a media editing interface, a page of the one or more pages based on the spatial arrangement; and present, via the media editing interface, a scene line adjacent to the page, where the scene line comprises a temporal arrangement of one or more scenes within the page, and where the one or more media elements are temporally arranged within the one or more scenes.

According to some aspects, computing device 1300 includes one or more processors 1305. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing. Processor 1305 is an example of, or includes aspects of, the processor unit described with reference to FIG. 2.

According to some aspects, memory subsystem 1310 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state. Memory subsystem 1310 is an example of, or includes aspects of, the memory unit described with reference to FIG. 2.

According to some aspects, communication interface 1315 operates at a boundary between communicating entities (such as computing device 1300, one or more user devices, a cloud, and one or more databases) and channel 1330 and can record and process communications. In some cases, communication interface 1315 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1320 is controlled by an I/O controller to manage input and output signals for computing device 1300. In some cases, I/O interface 1320 manages peripherals not integrated into computing device 1300. In some cases, I/O interface 1320 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1620 or via hardware components controlled by the I/O controller.

According to some aspects, user interface component(s) 1325 enables a user to interact with computing device 1300. In some cases, user interface component(s) 1325 include an audio device, such as an external speaker system, an external display device such as a display screen, an input device (e.g., a remote-controlled device interfaced with a user interface directly or through the I/O controller), or a combination thereof. In some cases, user interface component(s) 1325 include a GUI. In some embodiments, user interface component(s) 1325 is an example of, or includes aspect of, media editing interface described with reference to FIGS. 2, 6, 7, and 11.

The description and drawings described herein represent example configurations and do not represent all the implementations within the scope of the claims. For example, the operations and steps may be rearranged, combined, or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
   obtaining a project file comprising page data for a plurality of pages, wherein a page of the plurality of pages comprises a spatial arrangement of one or more media elements including an image element, a first video scene, and a second video scene;
   presenting, via a media editing interface, a page navigation element for navigating among the plurality of pages;
   receiving, via the page navigation element, a page navigation input indicating the page among the plurality of pages;
   presenting, via the media editing interface, the page of the plurality of pages based on the page navigation input, wherein the page includes the image element at a location of the page based on the spatial arrangement; and
   presenting, via the media editing interface, a scene line and a contextual track based on the page navigation input, wherein the scene line comprises a temporal arrangement of the first video scene and the second video scene within the page, and wherein the contextual track indicates a temporal overlap of the image element with the first video scene and the second video scene.

2. The method of claim 1, further comprising:
   identifying a campaign comprising a plurality of projects;
   presenting the plurality of projects in the campaign; and
   receiving a user input identifying a project from the plurality of projects, wherein the project file is obtained based on the user input.

3. The method of claim 1, further comprising:
   presenting, via the media editing interface, an additional page of the plurality of pages based on the page navigation input.

4. The method of claim 1, wherein:
   the project file comprises an ordering of the plurality of pages.

5. The method of claim 1, further comprising:
   presenting a page control element in the media editing interface; and
   receiving a page control input via the page control element.

6. The method of claim 5, wherein:
   the page control element comprises an add page element, a remove page element, a duplicate page element, a page size element, or a page orientation element.

7. The method of claim 1, further comprising:
   presenting a temporal control element in the media editing interface;
   receiving a temporal control input via the temporal control element; and
   modifying a scene of one or more scenes within the page based on the temporal control input.

8. The method of claim 7, wherein:
   the temporal control element comprises a video sequencing element, a video transition element, or a video pacing element.

9. The method of claim 1, further comprising:
   receiving a media selection input selecting a media element of the one or more media elements; and
   presenting the contextual track adjacent to the scene line based on the media selection input.

10. The method of claim 1, further comprising:
    receiving media position input modifying a position of a media element of the one or more media elements; and
    presenting the media element at the modified position within the page.

11. The method of claim 1, further comprising:
    receiving user input via the media editing interface; and
    generating a modified project file based on the user input.

12. The method of claim 11, further comprising:
    publishing the modified project file to a social media platform.

13. The method of claim 11, wherein:
    the modified project file comprises a multiple scene video.

14. The method of claim 11, wherein:
    the modified project file comprises a multiple page presentation.

15. A non-transitory computer readable medium storing code for content editing, the code comprising instructions executable by a processor to:
- obtain a project file comprising page data for a plurality of pages, wherein a page of the plurality of pages comprises a spatial arrangement of one or more media elements including a first video scene and a second video scene;
- present, via a media editing interface, a page navigation element for navigating among the plurality of pages;
- receive, via the page navigation element, a page navigation input indicating the page among the plurality of pages;
- present content to a user via the media editing interface including a page control element for modifying the spatial arrangement of the page of the content based on the page navigation input and a temporal control element for modifying a temporal arrangement of the first video scene and the second video scene located within the page;
- receive a page control input for editing the content via the page control element;
- receive a temporal control input for editing the content via the temporal control element; and
- generate modified content based on the page control input and the temporal control input.

16. The non-transitory computer readable medium of claim 15, the code further comprising instructions executable by the processor to:
- generate a multiple scene video based on the temporal control input, wherein the modified content includes the multiple scene video.

17. An apparatus comprising:
- a processor; and
- a memory comprising instructions executable by the processor to:
  - obtain a project file, via a media editing interface, comprising page data for a plurality of pages, wherein a page of the plurality of pages comprises a spatial arrangement of one or more media elements including an image element, a first video scene, and a second video scene;
  - present, via the media editing interface, a page navigation element for navigating among the plurality of pages;
  - receive, via the page navigation element, a page navigation input indicating the page among the plurality of pages;
  - present, via the media editing interface, the page of the plurality of pages based on the page navigation input, wherein the page includes the image element at a location of the page based on the spatial arrangement; and
  - present, via the media editing interface, a scene line and a contextual track based on the page navigation input, wherein the scene line comprises a temporal arrangement of the first video scene and the second video scene within the page, and wherein the contextual track indicates a temporal overlap of the image element with the first video scene and the second video scene.

18. The apparatus of claim 17, wherein:
the media editing interface comprises the page navigation element, a page control element, and a temporal control element.

19. The apparatus of claim 18, wherein:
the page control element comprises an add page element, a remove page element, a duplicate page element, a page size element, or a page orientation element.

20. The apparatus of claim 18, wherein:
the temporal control element comprises a video sequencing element, a video transition element, or a video pacing element.

* * * * *